(12) United States Patent
Klaricic

(10) Patent No.: US 7,231,845 B2
(45) Date of Patent: Jun. 19, 2007

(54) CONE SELECTOR AND ASSOCIATED TRANSMISSION ASSEMBLY

(75) Inventor: Boris Klaricic, Victoria (AU)

(73) Assignee: Select Design Technologies Limited, Melbourne, Victoria (AU)

( * ) Notice: Subject to any disclaimer, the term of this patent is extended or adjusted under 35 U.S.C. 154(b) by 0 days.

(21) Appl. No.: 10/312,254

(22) PCT Filed: Nov. 2, 2001

(86) PCT No.: PCT/AU01/01416

§ 371 (c)(1),
(2), (4) Date: Dec. 24, 2002

(87) PCT Pub. No.: WO02/36977
PCT Pub. Date: May 10, 2002

(65) Prior Publication Data
US 2003/0167868 A1 Sep. 11, 2003

(30) Foreign Application Priority Data
Nov. 3, 2000 (AU) .................................. PR1232
Jan. 16, 2001 (AU) .................................. PR2557

(51) Int. Cl.
*F16H 3/22* (2006.01)
(52) U.S. Cl. .................... 74/349; 74/333; 74/340; 74/357; 74/359; 192/48.9; 192/66.21; 192/66.23; 192/70.15; 192/85 AA
(58) Field of Classification Search ............... 74/333, 74/325, 340, 349, 356, 357, 359; 192/104 B, 192/104 F, 103 B, 66.21, 66.23, 88 B, 85 AT, 192/48.8, 48.9, 70.15, 109 F, 85 A, 85 AA, 192/85 C, 53.32; 92/84, 129
See application file for complete search history.

(56) References Cited

U.S. PATENT DOCUMENTS 1,300,898 A * 4/1919 Vincent ..................... 192/85 A (Continued)

FOREIGN PATENT DOCUMENTS

AU 261217 1/1962

*Primary Examiner*—David D. Le
(74) *Attorney, Agent, or Firm*—Young & Thompson

(57) ABSTRACT

A multi cone selector in a transmission employs sandwiched cone friction surfaces 19A, 20A and 21A and these are shown in free or unengaged state while the corresponding friction surfaces as numerals 19, 20 and 21 are shown as engaged. This comparative illustration shows the relative positions of the surfaces at different times since the "A" surfaces and the non "A" surfaces are the same circumferential surfaces. The cone selector is used to engage free rotating gear a female part 22 of a multi-cone selector. A hydraulic actuator 23 is received by internal gear case wall 24 formed so as to prevent any radial or axial movement of the actuator itself. A hydraulic coupling, in this case the hydraulic coupling is formed as hydraulic springs or bags illustrated at 26. The crown of hydraulic spring outlet piston is formed so as to clip in a housing of a thrust bearing 29. The function of thrust bearing 29 is to provide relative rotational movements between cone clutch male part 30 and a piston of a hydraulic spring whether in idling or power transmitting mode. Twin cone selector comprises male part 30, female part 22 and cones 31 and 32. Cone 31 operates as a driving cone and is constrained but free to slide parallel to the axis of rotation in circular slots 33. Cone 32 operates as a driven cone and is constrained but free to slide parallel to the axis of rotation in circular slots 36.

13 Claims, 8 Drawing Sheets

U.S. PATENT DOCUMENTS

| | | | | |
|---|---|---|---|---|
| 2,283,292 A | | 5/1942 | Smith | |
| 2,510,469 A | | 6/1950 | Greenlee | |
| 2,965,205 A | * | 12/1960 | Winchell | 192/66.23 |
| 3,286,801 A | * | 11/1966 | Wojcikowski | 192/53.331 |
| 3,835,974 A | * | 9/1974 | Kraus | 192/87.15 |
| 4,099,601 A | * | 7/1978 | Pittman | 188/163 |
| 4,226,318 A | * | 10/1980 | Morgan | 192/85 CA |
| 4,368,650 A | * | 1/1983 | Numazawa et al. | 475/136 |
| 4,445,602 A | * | 5/1984 | Chana | 192/53.32 |
| 4,614,259 A | * | 9/1986 | Eguchi | 192/70.11 |
| 4,687,081 A | * | 8/1987 | Osterloff et al. | 192/53.32 |
| 4,795,016 A | * | 1/1989 | Schisler | 192/88 A |
| 4,856,637 A | * | 8/1989 | Gebhart | 192/105 C |
| 5,419,421 A | * | 5/1995 | Lohr | 192/105 BA |
| 5,503,261 A | * | 4/1996 | Schultz | 192/105 CD |
| 5,603,397 A | * | 2/1997 | Meyers | 192/105 BA |
| 6,092,432 A | * | 7/2000 | Klaricic | 74/325 |
| 6,170,624 B1 | * | 1/2001 | Arai et al. | 192/3.58 |
| 6,324,930 B1 | * | 12/2001 | Forsyth | 74/446 |
| 6,478,129 B2 | * | 11/2002 | Lambertini | 192/105 CD |

\* cited by examiner

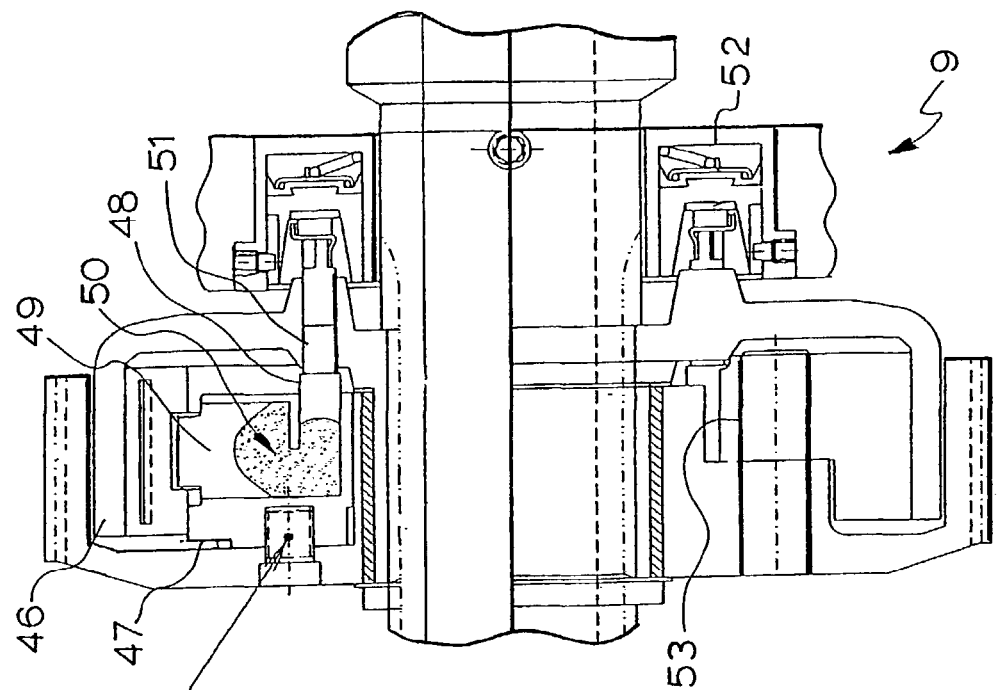
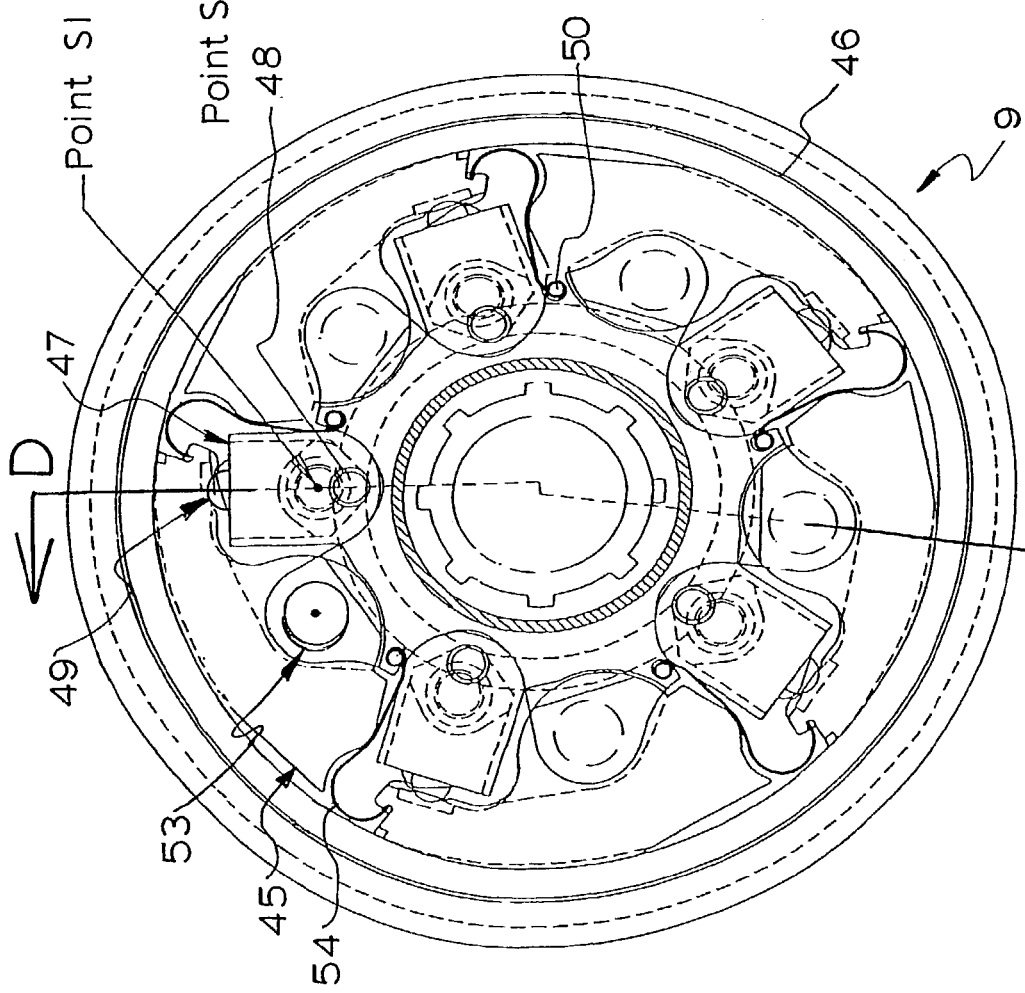

CONE SELECTOR AND ASSOCIATED TRANSMISSION ASSEMBLY

FIELD OF THE INVENTION

THIS INVENTION relates to a cone selector and associated transmission assembly and in particular but not limited to a compact transmission assembly employing two shafts.

BACKGROUND OF THE INVENTION

The applicant's U.S. Pat. No. 6,092,432 and International patent application WO 00/71909 are incorporated by reference and describe constant mesh transmissions employing hydraulic gear selectors used to engage free rotating gears on a first shaft to transmit drive to a fixed gear on an adjacent shaft. The present invention relates to developments in gear selectors suitable for the types of transmissions described and controlled in accordance with the general type arrangements disclosed in U.S. Pat. No. 6,092,432 and WO 00/71909.

OUTLINE OF THE INVENTION

In one aspect the invention resides in a cone selector for selection of a gear in a transmission, the cone selector employing a female cone surface and a male cone body having a driven cone surface and a driving cone surface, the driven cone surface being located between the driving cone surface and the female cone surface, the male cone body being axially moveable by a male cone body drive means to cause said cone surfaces to engage and thereby select the gear. The male cone body drive means comprises a hydraulic drive assembly comprising an input piston, an output piston and hydraulic coupling between the input and output pistons. The hydraulic coupling is preferably configured to amplify the applied force. The hydraulic cylinder assembly of said male cone body drive means is preferably a fixed annular cylinder assembly with thrust bearings coupling the output piston to the male cone body. The expression "multi-cone" refers to the use of driven cone surfaces sandwiched between other cone surfaces.

Preferably, increase in surface area may be accomplished by increasing the number of driven cone surfaces between the male and female cone surfaces.

In one preferred form the male and female cone bodies are part of a quad cone structure.

Preferably, the cone bodies are constrained to move axially by respective guides. The guides are typically respective concentric axially slidable guides moving in axially extending guide ways.

In another aspect the invention resides in a transmission assembly having an input, an output and gears permanently in mesh for selectively coupling the input to the output in predetermined ratio of input to output according to gear selection, at least one said gears being a free rotating gear having a gear selector comprising employing a female cone surface and a male cone body having a driven cone surface and a driving cone surface, the driven cone surface being located between the driving cone surface and the female cone surface, the male cone body being axially moveable by a male cone body drive means to cause said cone surfaces to engage.

Preferably the transmission is a constant mesh transmission which employs a mix of multi-cone selectors for all the gears in the transmission, with a higher number of cone surfaces for first and reverse gear and a lower number of cone surfaces for the other gears.

In another embodiment the transmission employs a multi-cone selector assembly on the main drive shaft to the transmission proper.

In a preferred form the transmission includes at least one other gear selector comprising a drum selector employing circumferentially spaced pads, each pad having a circumferentially extending pad surface, pad drive means driving the pads into driving engagement with a drum surface, the drum surface of a normally free rotating gear assembly, the gear assembly having a gear and being engageable when said pad surfaces engage said drum surface under the influence of said drive means, the pads being pivotal to a drum surface unengaged position about a first pivot axis and being pivotal to a drum surface engaged position about a second pivot axis spaced from the first pivot axis.

Preferably, the normally free rotating gear assembly includes a gear in permanent mesh with a fixed gear. Preferably, each pad is supported by a pad carrier having a centre of gravity spaced from the pivot axes in order to urge said pad to a drum surface unengaged position under the influence of centrifugal forces.

Preferably, the pad carrier has a first end nearer the centre of gravity and a second end opposite said first end and there being biassing means biassing said second end against said drive means and holding said pads in a drum surface unengaged position until overcome by said biassing means.

The pad drive means is preferably an annular hydraulic cylinder assembly having an axially moveable input piston, a radially moveable output piston and an intermediate hydraulic coupling between the pistons. Preferably, the output piston is circumferentially movable between circumferentially spaced position under the influence of said biassing means. The hydraulic cylinder assembly of the drive means is preferably a fixed annular cylinder assembly with thrust bearings coupling the output piston to the male cone body.

BRIEF DESCRIPTION OF THE DRAWINGS

FIG. 7 is an enlarged end view of drum type clutches used with second, third, fourth and fifth gears as per FIG. 1.

FIG. 8 is a sectional view D—D of FIG. 7 showing hydraulic spring and hydraulic actuator arrangement to operate drum clutches as per FIG. 1.

METHOD OF PERFORMANCE

Figure 1:
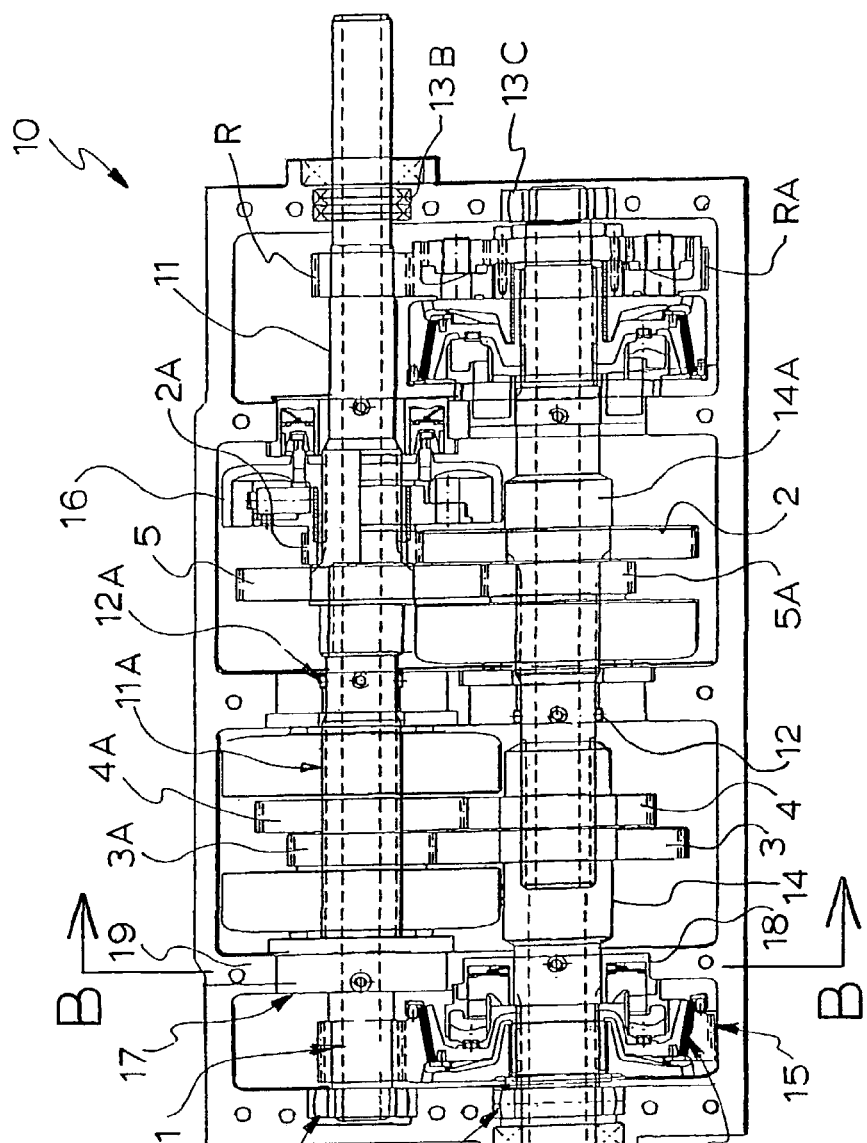
FIG. 1 is a general view of five speed two-shaft arrangement of a transmission.
Figure 4:
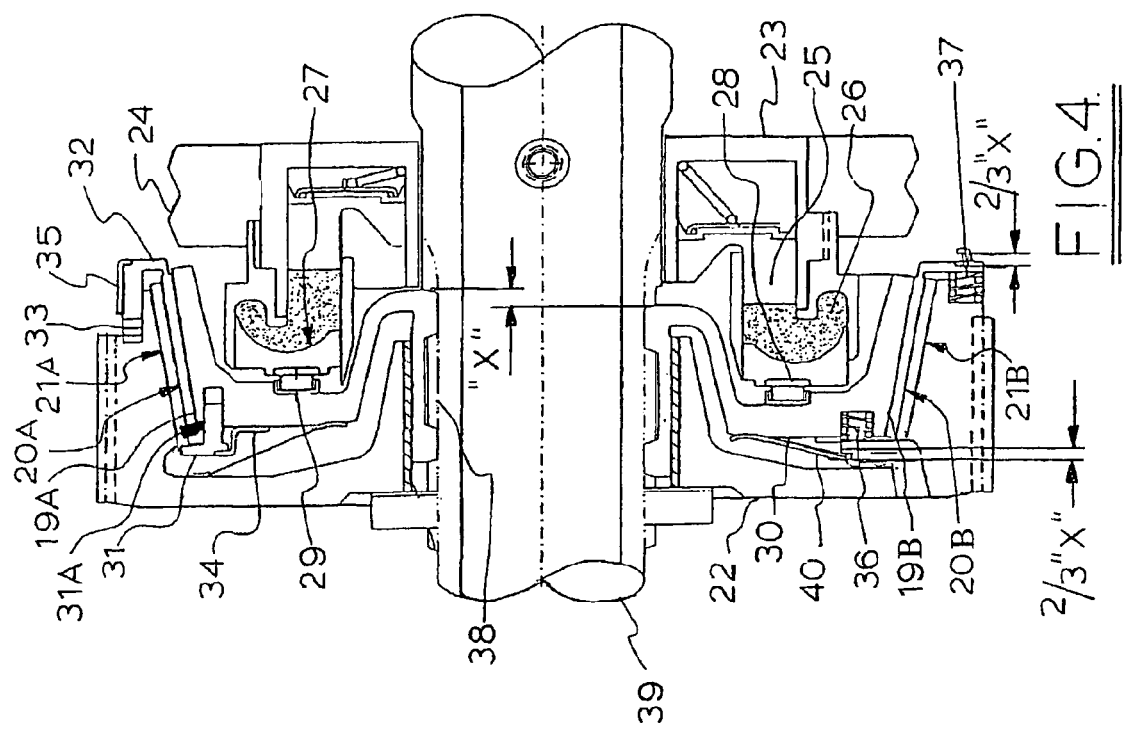
FIG. 4 is a sectional view A—A of FIG. 3 showing arrangement of a twin-cone clutch, hydraulic spring and hydraulic actuator for first gear as shown in FIG. 1.
Figure 3:
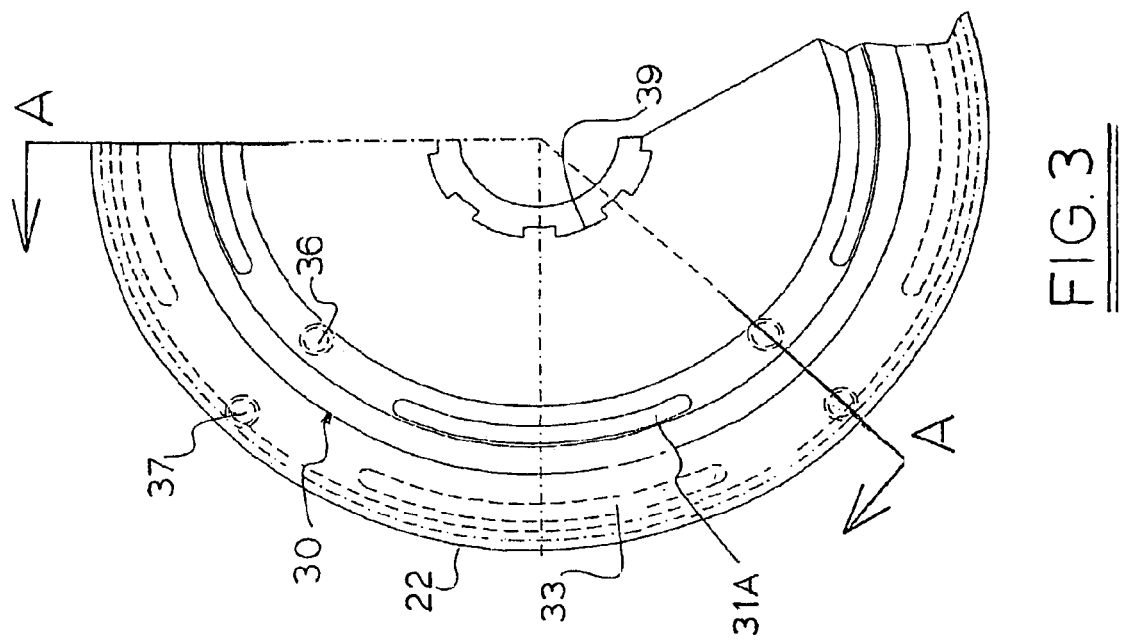
FIG. 3 is an enlarged end view of a twin-cone clutch as shown in FIG. 1 used to operate first gear.
Figure 9:
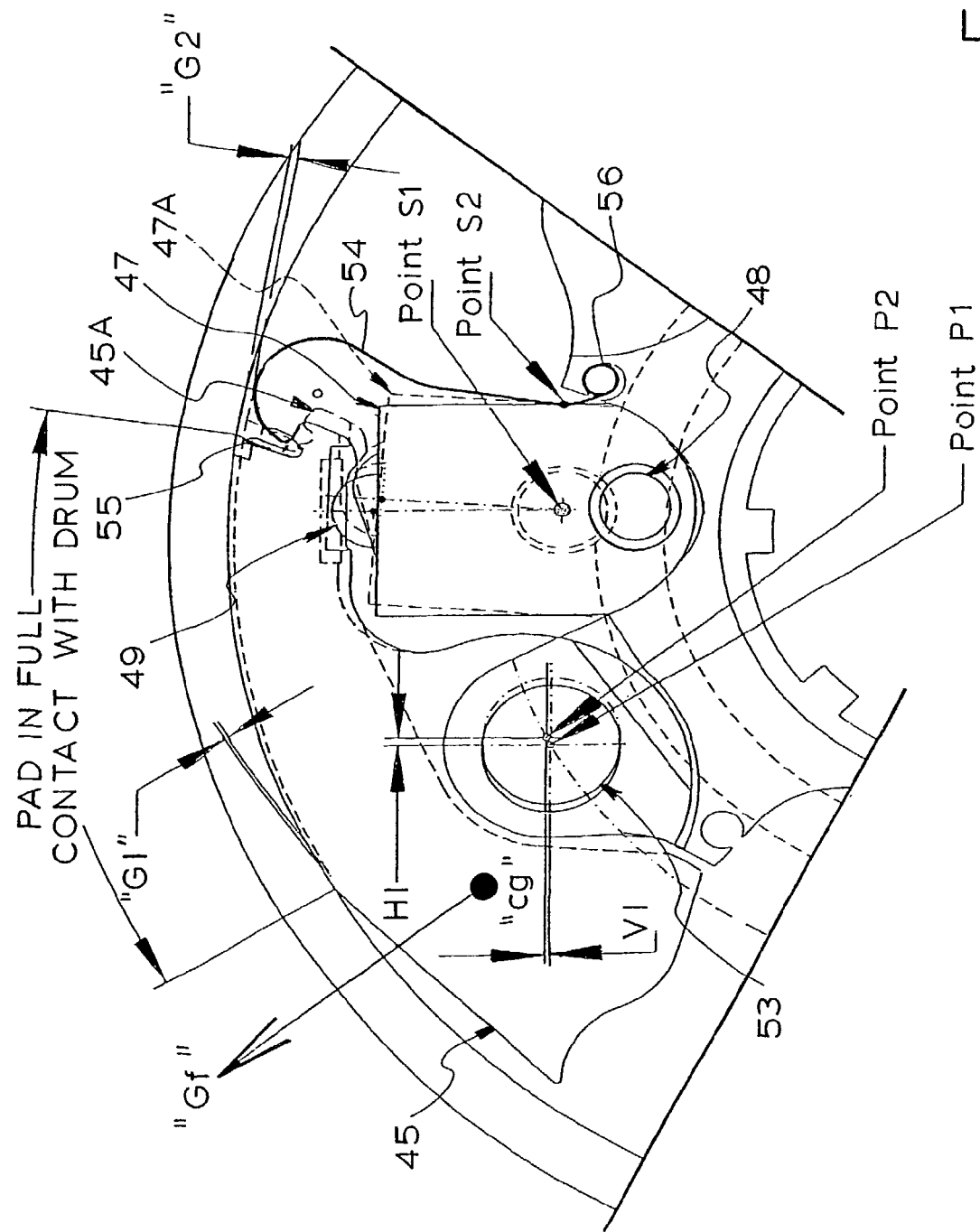
FIG. 9 is an enlarged partial view of FIG. 7 showing detailed geometry for driving elements and hydraulic spring.

Referring to FIG. 1 there is shown transmission apparatus 10 comprising shafts, free and fixed gears operatively associated for input and output according to gear selection to be described. The transmission is of the type involving free rotating gears and accompanying gear selector assemblies, each free rotating gear being in constant mesh with a fixed gear. The gears required for selection of first through fifth and reverse are marked as 1 through 5 and R on each fixed gear of the combination of constant mesh free rotating and fixed gear pairs in FIG. 1. Shafts 11 and 11A are supported on bearings 12A, 13 and 13B; shafts 14 and 14A are supported on bearings 12, 13A and 13C. Shafts 11 and 11A, 14 and 14A are firmly connected at their respective junctures by splines. First gear (1) and reverse gear (R) are fixed to input shafts 11A and 11 respectively. All free gears 1A through RA rotate on plain bearings and are attached to twin cone or drum selectors as per transmission general arrangement as shown in FIG. 1. A typical twin cone selector layout is shown in section at 15 and its details are shown in FIGS. 3 and 4. A typical drum selector is shown in section at 16 and its details are shown in FIGS. 7, 8 and 9.

Figure 2:
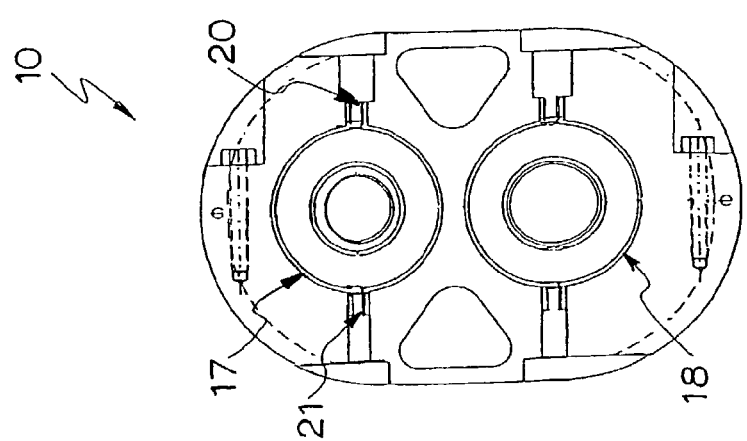
FIG. 2 is a section through B—B of FIG. 1.

FIG. 2 has been generated to show arrangement of annular hydraulic cylinders 17 and 18 and gear casing flange mountings 19 holding the hydraulic cylinders. Fluid pressure to hydraulic cylinders is supplied via inlet port 20 and bleeding of trapped air via port 21. Corresponding ports are provided for hydraulic cylinder 18. Cylinder 17 selects gear 1 while cylinder 18 selects gear 3. Each gear pair has its own annular hydraulic cylinder.

FIGS. 3 and 4 show detailed enlarged views of a typical twin cone selector as may be used as gear 1 selector. The selector illustrated has general application to the selector to any gear. The twin-cone selector increases transmission of power and torque three times to that produced by a single cone. This is achieved by the increased number of friction surfaces from one pair to three pairs. Referring to the top part of FIG. 4, friction surfaces are numbered 19A, 20A and 21A and these are shown in free or unengaged state while the bottom part of FIG. 4 shows the corresponding friction surfaces as numerals 19B, 20B and 21B as engaged. It will be appreciated that this is only a comparative illustration and that in real operation the friction surfaces will be in one only of the positions illustrated at any one time since the "A" surfaces and the "B" surfaces are the same circumferential surfaces. It can be seen that the transmission of power and torque from the gear 1 input shaft 11A to the driven shaft 14 is realized as described in the following passage:

Input shaft 11A is connected to a power source and carries first gear 1 firmly fixed to it and in permanent mesh with free rotating gear (1A in FIG. 1 embodiment), which is in this case also a female part 22 of a cone selector as shown in FIG. 4. A hydraulic actuator 23 having hydraulic components as piston, seal, spring and pressure washer is received by internal gear case wall 24 formed so as to prevent any radial or axial movement of the actuator 23. The circular part or crown of the hydraulic cylinder piston is formed so as to fit and act as an annular inlet piston 25 engageable with a first hydraulic coupling 26, in this case the hydraulic coupling is formed as hydraulic springs or bags illustrated at 27. The crown of first hydraulic coupling 26 forms an outlet piston at 28 formed so as to clip in a housing of respective thrust bearings 29. The function of thrust bearing 29 is to provide relative rotational movements between cone clutch male part 30 and a piston 28 of a first hydraulic coupling 26 whether in idling or power transmitting mode. Twin cone selector comprises male part 30, female part 22 and cones 31 and 32. Cone 31 operates as a driving cone and is constrained but free to slide parallel to the axis of rotation in circular slots 31A formed in male part 30. Cone 32 operates as a driven cone and is constrained but free to slide parallel to the axis of rotation in circular slots 33 formed in driven female part 22 of the selector assembly. The movements of cones 31 and 32 are controlled by stops 34 and 35 and compression springs 36 and 37.

Hydraulic fluid pressure when supplied to hydraulic cylinder 23 of FIG. 4 exerts an axial force onto piston 25. This force acts on the hydraulic coupling spring 26 and against spring bag 27 causing progressive movement of male cone 30 in grooves 38 along shaft 39 and thus clamping cones 31 and 32 against female cone 22. A conical spring 40 is placed between the male and female cones which when hydraulic pressure is cut off causes retraction of the male cones to a free rotating state. Compression springs 36 and 37 as shown in FIGS. 3 and 4 retract driving cone 31 and driven cone 32 to free rotating states when hydraulic pressure is cut off. The distance "X" in FIG. 4 indicates total movement of the male cone to engage or disengage the selector. The stops 34 and 35 have clearance relative to cones 31 and 32 of ⅔ of "X". This provides uniform clearance between cones when in neutral or unengaged state.

Figure 6:
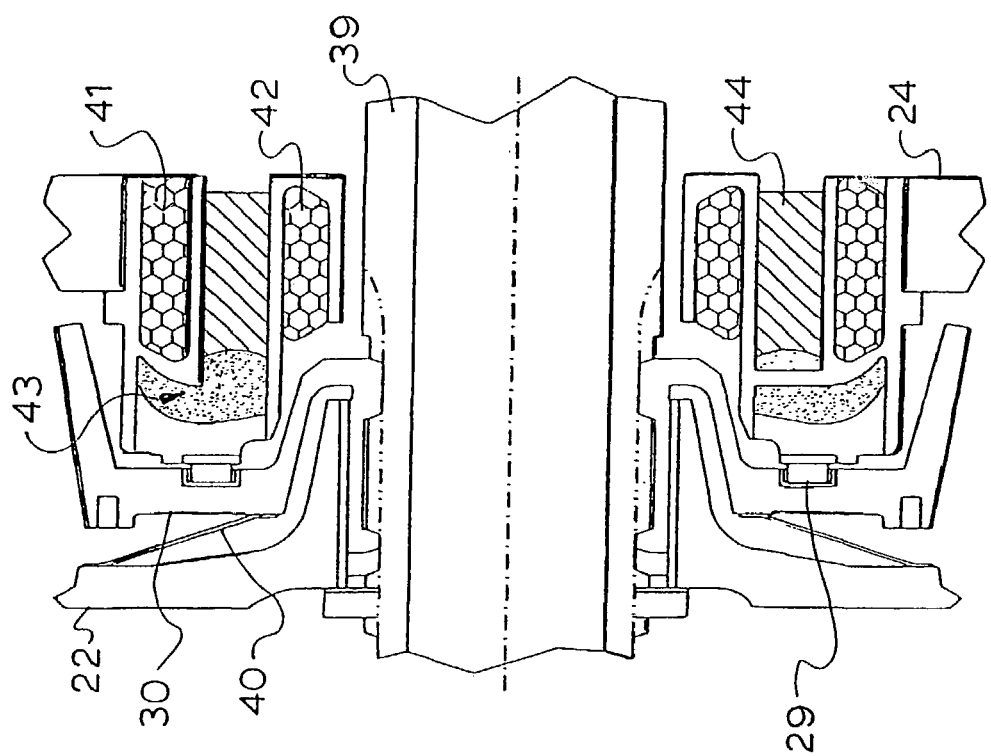
FIG. 6 is a sectional view C—C of FIG. 5 showing arrangement of hydraulic spring and electric actuator for operation of cone clutch.
Figure 5:
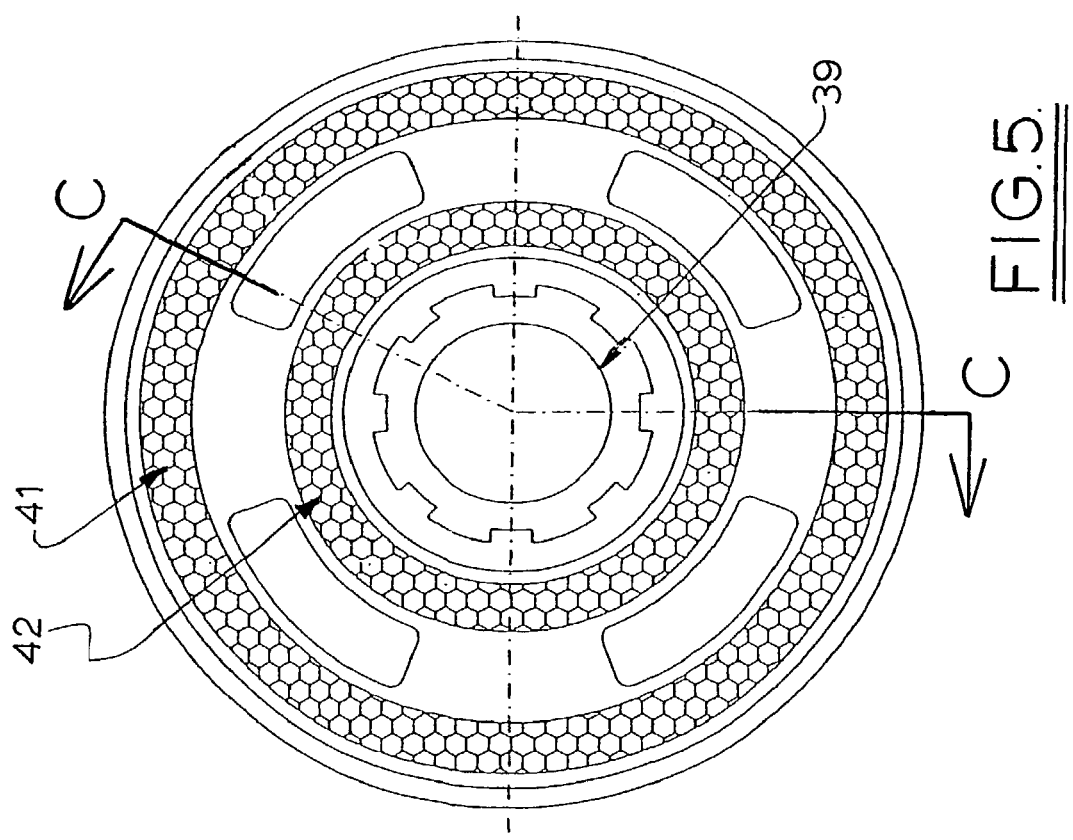
FIG. 5 is an enlarged end view showing arrangement of hydraulic spring and electric solenoid actuator for drum and twin-cone gear selectors as per FIG. 1.

FIGS. 5 and 6 show an alternative embodiment, like numerals illustrate like features, involving actuation of twin cone selectors by electric solenoids 41 and 42 in combination with a second hydraulic spring coupling 43. When solenoids are energized a circular plunger 44 activated by magnetomotive force presses hydraulic spring 43 and its piston against male cone 30 thus achieving engagement of the cone selector essentially as previously described. The female cone 22 is shown in part and the driving cone 31 and driven cone 32 have been omitted. FIGS. 5 and 6 merely illustrate an alternative drive.

In the preferred embodiment twin cone selectors are applicable to first and reverse gears as shown in FIG. 1. Other gears in this general arrangement transmission are operated by drum selectors actuated by an hydraulic cylinder assembly and hydraulic spring of different shape but in principle functioning as described above.

Referring to FIGS. 7 and 8 it can be seen that a typical drum selector 9 has a friction area contact between driving pads 45 and drum 46. A hydraulic spring body 47 is employed as a coupling between input and output pistons 48 and 49. The hydraulic spring increases the pressure by several times on the driving pads 45 and consequently higher power and torque can be transmitted with reduced hydraulic pump pressures. In this sense the hydraulic coupling functions as a force multiplier or amplifier.

The hydraulic spring comprises body 47, output piston 49, input piston 48 and spring sack 50. The sack 50 is made of elastic material compatible with transmission and hydraulic fluids. It is filled with fluid or gel of hydraulic properties and fully sealed making it leak-proof. The spring sack 50 is shaped to fit exactly a cavity as defined by piston 49 and 48 and spring body 47. This provides constant pressure on pads 45 from output piston 49 when spring sack 50 is pressed by piston 48 and converts axial movement to radial movement. The force produced by output piston 49 is a function of its cross section and cross sectional area of input piston 48 as well as force from push ring 51 provided by annular hydraulic cylinder 52.

Referring to FIG. 9 it can be seen that the drum type gear selector 9 employing the earlier described driving pad geometry, which allows a pad to be in full contact with the drum and the inclusion of the hydraulic spring coupling makes the assembly a simple and effective solution for power shift of gears. The full contact is accomplished by elongated pivot 53 hole by "H1" amount in horizontal direction and "V1" in the vertical direction. The driving pad 45 itself is also improved in strength by making it stronger in areas where required. Each pad has its centre of gravity "Cg" on the left side of pivot point 53 so that the pad's centrifugal force "Cf" is acting in direction as shown in FIG. 9 thus keeping the pad out of contact with the drum when it rotates in neutral. A spring 54 has one end hooked into a slot 55 of pad 45 and its other end is anchored at point 56, and also is resting on the hydraulic spring at Point S2. The spring arrangement and its shape allow spring 54 to act in two major directions required for proper operation of pad 45. One action is to pull pad 45 about its pivot point 53 to a neutral position 45A by rotating pad 45 about pivot 53 for distance "Hi, Vi" moving Point P1 into Point P2. At the same time when the pad 45 is pulled to position 45A, the hydraulic spring body 47 is rotated about its pivot Point Si to position 47A against spring 54. These two movements place the pad 45 in its rest position with clearance gaps "Gi" and "G2" at rear and front of the pad respectively. It has to be noted that centrifugal force "cf" is. a major force, which keeps the pads in a neutral position when gears are in free operating mode. The result in the differential pivot P1, P2 is to improve surface contact between the pad 45 and the drum 46.

This illustrated embodiment exemplifies the use of twin cone friction selectors and drum friction selectors both fitted with hydraulic springs as devices for selecting and engaging gears.

Figure 11:
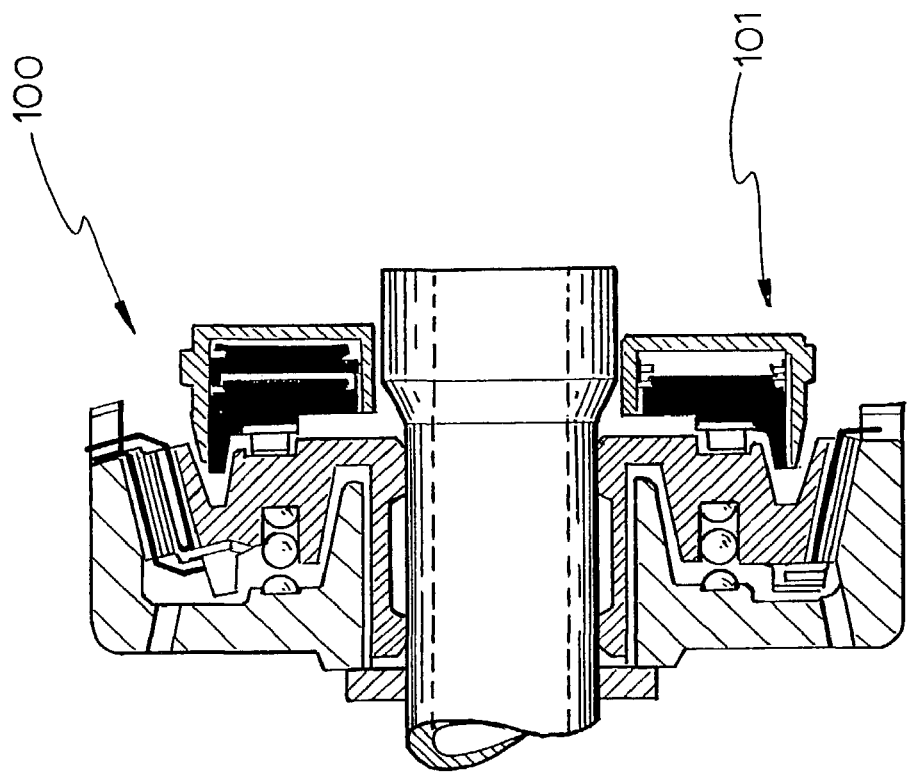
FIGS. 10 and 11 illustrate by comparative illustration a twin cone of the type illustrated in the earlier figures in the lower half of FIG. 11 and by comparison in the upper half of FIG. 11 increase in surface area by increasing the number of driven cone surfaces between the male and female cone surfaces.
Figure 10:
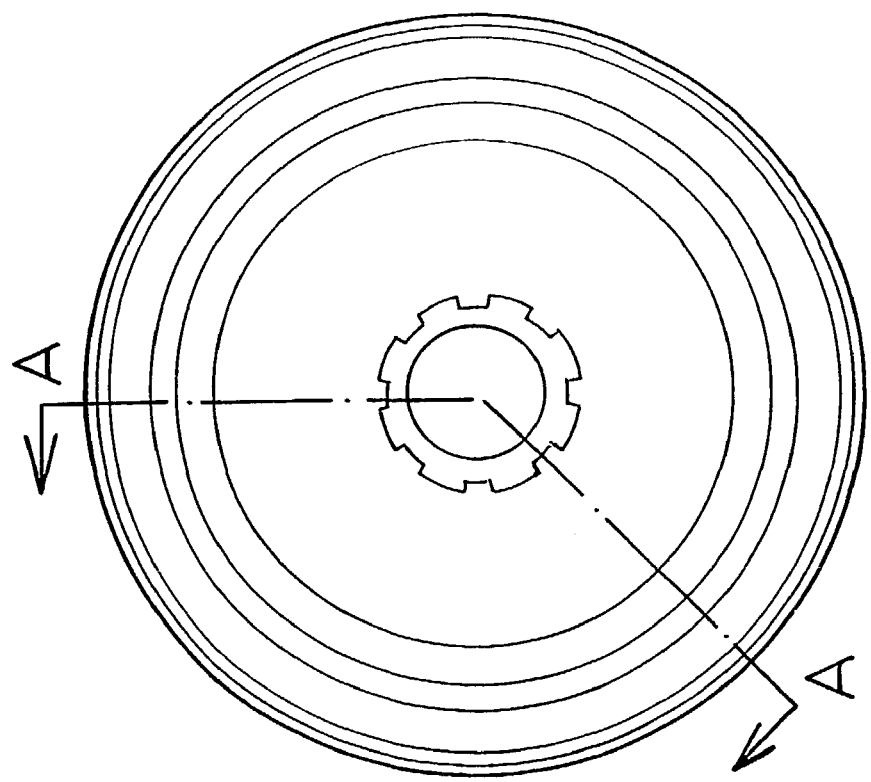
Figure 12:
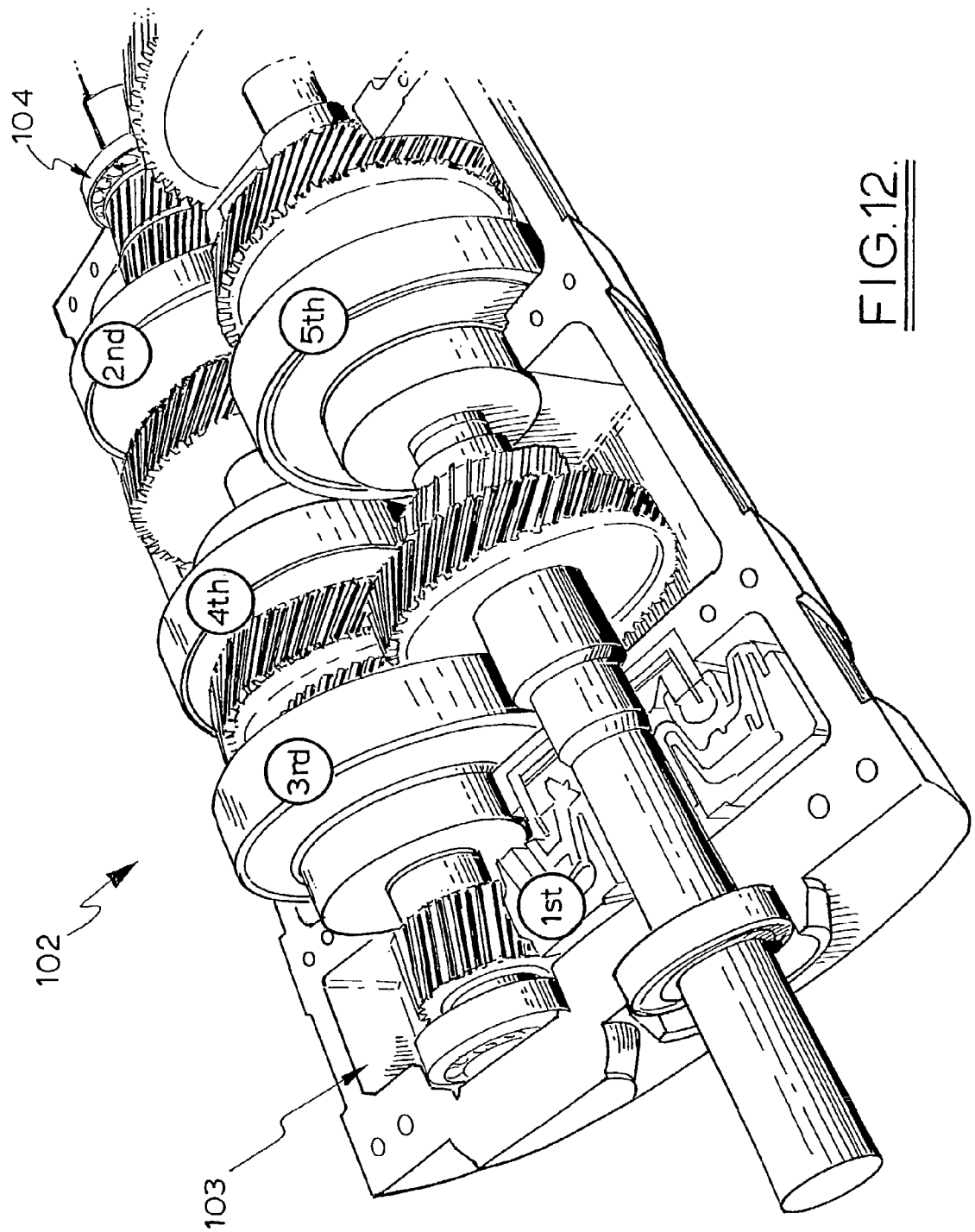
FIG. 12 illustrates a further embodiment of the present invention employing a mix of multi-cone selectors for all the gears in a five speed transmission, with quad cone selectors for first and reverse gear and twin cone selectors for the other gears and being substantially as described earlier.

In addition permutations of the selectors may be used depending upon design requirements, some gears may employ a greater clutching surface, for example first gear and reverse may employ extra driven cones than the other gears. This is illustrated in the comparison drawing of FIGS. 10 and 11, it will be understood that FIG. 11 is a single drawing but does in fact illustrate two different selectors, one employing a quad cone clutch at 100 and the other a twin cone clutch at 101, the quad cone clutch provides increased surface area suitable for lower gears, while the twin cone clutch is suitable for higher gears using the same basic cross-section so that a compact assembly might be achieved using all multi-cone clutches rather than the drum friction clutches. The transmission 102 of FIG. 12 is a typical example the transmission is in substance the same general form as the embodiment of FIG. 1 in that the transmission is a constant mesh transmission, except in this case cone clutch type selectors are used throughout, selectors of the quad cone clutch type are used for first and reverse gears 103 and 104 while selectors of the twin cone clutch type are used for the other gears.

Figure 13:
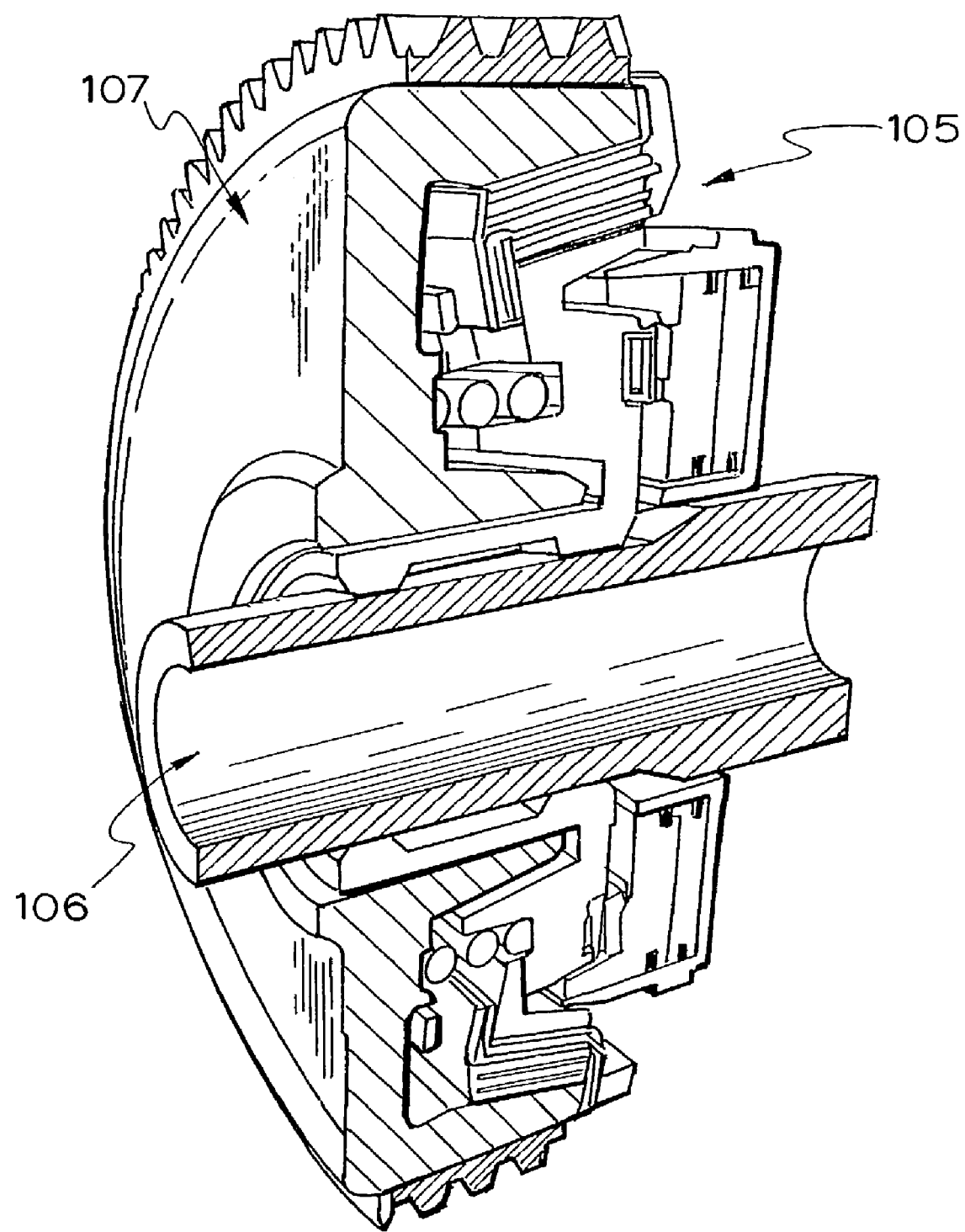
FIG. 13 illustrates a further embodiment of a selector having a quad cone clutch in combination with a transmission.

FIG. 13 illustrates further application of a selector of the multi-cone clutch type in combination with a transmission, in this case a selector employing a quad cone clutch 105 on the input shaft 106 is used in place of a conventional torque convertor, the clutch 105 is shown within a fly wheel 107, so it will be appreciated that the multi-cone clutch configuration may be used in a transmission assembly and in those circumstances where a torque convertor would be used outside the assembly.

Accordingly, it will be appreciated that many modifications and improvements can be made to the transmission general arrangement system and gear selectors as exemplified above without departing from the broad ambit and scope of the invention as set out in the appended claims.

The invention claimed is:

1. A transmission assembly having an input, an output and spaced sets of gears, each set of gears comprising gears constantly in mesh for selectively coupling the input to the output in predetermined ratio of input to output according to gear selection, at least one of said sets of gears having a free rotating gear in mesh with a fixed gear, the free rotating gear having a multi-cone gear selector comprising:

a female cone body having a first cone surface;

a male cone body adjacent said female cone body and having a second cone surface;

a driven cone having a third cone surface; and a driving cone having a fourth cone surface, wherein the third cone surface is located between the fourth cone surface and the first cone surface, wherein the male cone body is axially moveable against a bias to cause cone surfaces of said driven cone, said driving cone, said male cone body and said female cone body to engage and thereby progressively engage the cone surfaces to transfer input power from the input to the output through the cone surfaces, and wherein the input and output are asynchronous at the time of engagement of said cone surfaces, said driving cone comprising a rigid non-deformable conical body, said driven cone comprising a rigid non-deformable conical body, said driving cone and said driven cone being located between the female and male cone bodies, all the cone bodies being mounted concentrically and being axially relatively moveable into and out of engagement while maintaining concentricity, each of the driven and driving cones having respective stops limiting axial movement and respective bias means urging the driven and driving cones toward said stops.

2. A transmission assembly according to claim 1 wherein the transmission is a constant mesh transmission having first and reverse gears and a range of other gears, the transmission employing a mix of multi-cone selectors for all the gears in the transmission, there is a higher number of cone surfaces in the selectors for first and reverse gears than in the selectors for the other gears.

3. A transmission assembly according to claim 1 having a main drive shaft to said input and further comprising a multi-cone selector assembly on the main drive shaft for controlling drive to the output.

4. A transmission assembly according to claim 1 wherein the free rotating gear is part of an assembly, which includes a gear in permanent mesh with a fixed gear.

5. A transmission assembly according to claim 1 further comprising a male cone body drive means, which comprises a hydraulic drive assembly comprising an input piston, an output piston and a hydraulic coupling between the input and output pistons.

6. A transmission assembly according to claim 1 further comprising a male cone body drive means, which comprises a hydraulic drive assembly comprising an input piston, an output piston and a hydraulic coupling between the input and output pistons, the hydraulic coupling comprising a force amplifier.

7. A transmission assembly according to claim 1 further comprising a male cone body drive means, which comprises a hydraulic drive assembly comprising an input piston, an output piston and a hydraulic coupling between the input and output pistons, the hydraulic drive assembly of said male cone body drive means is a fixed annular cylinder assembly with thrust bearings coupling the output piston to the male cone body.

8. A transmission assembly according to claim 1 wherein the male and female cone bodies are part of a quad cone structure, employing an extra axially moveable cone body concentrically mounted between the driven and driving cones.

9. A transmission assembly according to claim 1 wherein the driven cone, the driving cone and the male cone body are constrained to move axially by respective guides.

10. A transmission assembly according to claim 1 wherein the driven cone, the driving cone and the male cone body are constrained to move axially by respective concentric axially slidable guides moving in axially extending guide ways.

11. A transmission assembly according to claim 1 further comprising a male cone body drive means, which comprises a hydraulic drive assembly comprising an input piston, an output piston and a hydraulic coupling between the input and output pistons, the hydraulic coupling comprising a force amplifier, the driven and driving cone bodies being constrained to move axially by respective concentric axially slidable guides moving in axially extending guide ways.

12. A transmission assembly according to claim 1 having said spaced sets of gears, each set comprising gears constantly in mesh for selectively coupling the input to the output in predetermined ratio of input to output according to gear selection, each set enabling selection of one ratio only.

13. A transmission assembly having an input shaft, an output shaft and spaced sets of gears, each set of gears comprising gears constantly in mesh for selectively coupling the input shaft to the output shaft in predetermined ratio of input to output according to gear selection, at least one of said sets of gears having a free rotating gear in mesh with a fixed gear, the free rotating gear having a gear selector comprising:

a female cone body;

a male cone body facing said female cone body;

a driven cone between said male cone body and said female cone body; and a driving cone between said female cone body and said driven cone, wherein said male cone body is axially moveable against a bias to cause cone surfaces of said driven cone, said driving cone, said male cone body and said female cone body to engage and thereby progressively engage said cone surfaces to transfer input power from the input shaft to the output shaft through said cone surfaces, said input shaft and said output shaft being asynchronous at the time of engagement of said cone surfaces, said driving cone comprising a rigid non-deformable conical body, said driven cone comprising a rigid non-deformable conical body, said driving cone and said driven cone being located between the female and male cone bodies, all the cone bodies being mounted concentrically and being axially relatively moveable into and out of engagement while maintaining concentricity, each of the driven and driving cones having respective stops limiting axial movement and respective bias means urging the driven and driving cones toward said stops.

* * * * *